US012585519B2

(12) United States Patent
Balaka et al.

(10) Patent No.: US 12,585,519 B2
(45) Date of Patent: Mar. 24, 2026

(54) DATABASE SYSTEM INCIDENT EVALUATION, CLASSIFICATION, AND RESOLUTION SYSTEM

(71) Applicant: Salesforce, Inc., San Francisco, CA (US)

(72) Inventors: Jyothi Balaka, San Ramon, CA (US); Srinivas Bhamidipati, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 67 days.

(21) Appl. No.: 18/415,850

(22) Filed: Jan. 18, 2024

(65) Prior Publication Data

US 2025/0238299 A1     Jul. 24, 2025

(51) Int. Cl.
| | |
|---|---|
| *G06F 11/00* | (2006.01) |
| *G06F 11/07* | (2006.01) |
| *G06F 11/34* | (2006.01) |

(52) U.S. Cl.
CPC ...... *G06F 11/0769* (2013.01); *G06F 11/0793* (2013.01); *G06F 11/3409* (2013.01); *G06F 2201/80* (2013.01)

(58) Field of Classification Search
CPC ............. G06F 11/0769; G06F 11/0793; G06F 11/3409
See application file for complete search history.

(56) References Cited

U.S. PATENT DOCUMENTS

| | | | |
|---|---|---|---|
| 11,755,394 B2 | 9/2023 | Balaka | |
| 2014/0136682 A1* | 5/2014 | Lukas | G06F 11/3433 709/224 |
| 2021/0240558 A1 | 8/2021 | Balaka | |
| 2022/0327126 A1 | 10/2022 | Balaka | |
| 2023/0084422 A1* | 3/2023 | Shah | G06F 11/366 714/26 |
| 2023/0094373 A1* | 3/2023 | Muralidharan | G06F 11/3409 714/38.1 |
| 2023/0095756 A1* | 3/2023 | Wilkinson | H04L 63/1416 726/6 |
| 2025/0004450 A1* | 1/2025 | Anthony | G05B 19/4184 |
| 2025/0028524 A1* | 1/2025 | Cheng | G06F 8/36 |
| 2025/0045148 A1* | 2/2025 | Acharya | G06F 11/079 |
| 2025/0077778 A1* | 3/2025 | Zhang | G06F 16/38 |

(Continued)

*Primary Examiner* — Elmira Mehrmanesh
(74) *Attorney, Agent, or Firm* — Polygon IP, LLP

(57) ABSTRACT

A computing services environment may include a database system, a vector store, a generative language model interface, and/or an incident response system. The database system may be configured to detect a database system incident affecting database system availability or performance and to generate a database incident report characterizing the database system incident. The generative language model interface may be configured to determine a textual description of the database system incident and identify one or more records of the plurality of records by completing an incident evaluation prompt via a generative language model. An incident response engine may be configured to determine an instruction to resolve the database incident based on the textual description and the one or more records, wherein the database system is configured to execute the instruction to update one or more configuration parameters.

20 Claims, 9 Drawing Sheets

(56) References Cited

U.S. PATENT DOCUMENTS

| | | | |
|---|---|---|---|
| 2025/0111267 A1* | 4/2025 | Huang | G06F 40/30 |
| 2025/0117282 A1* | 4/2025 | Bhukar | G06F 11/0793 |
| 2025/0150364 A1* | 5/2025 | Vasseur | H04L 41/5054 |

* cited by examiner

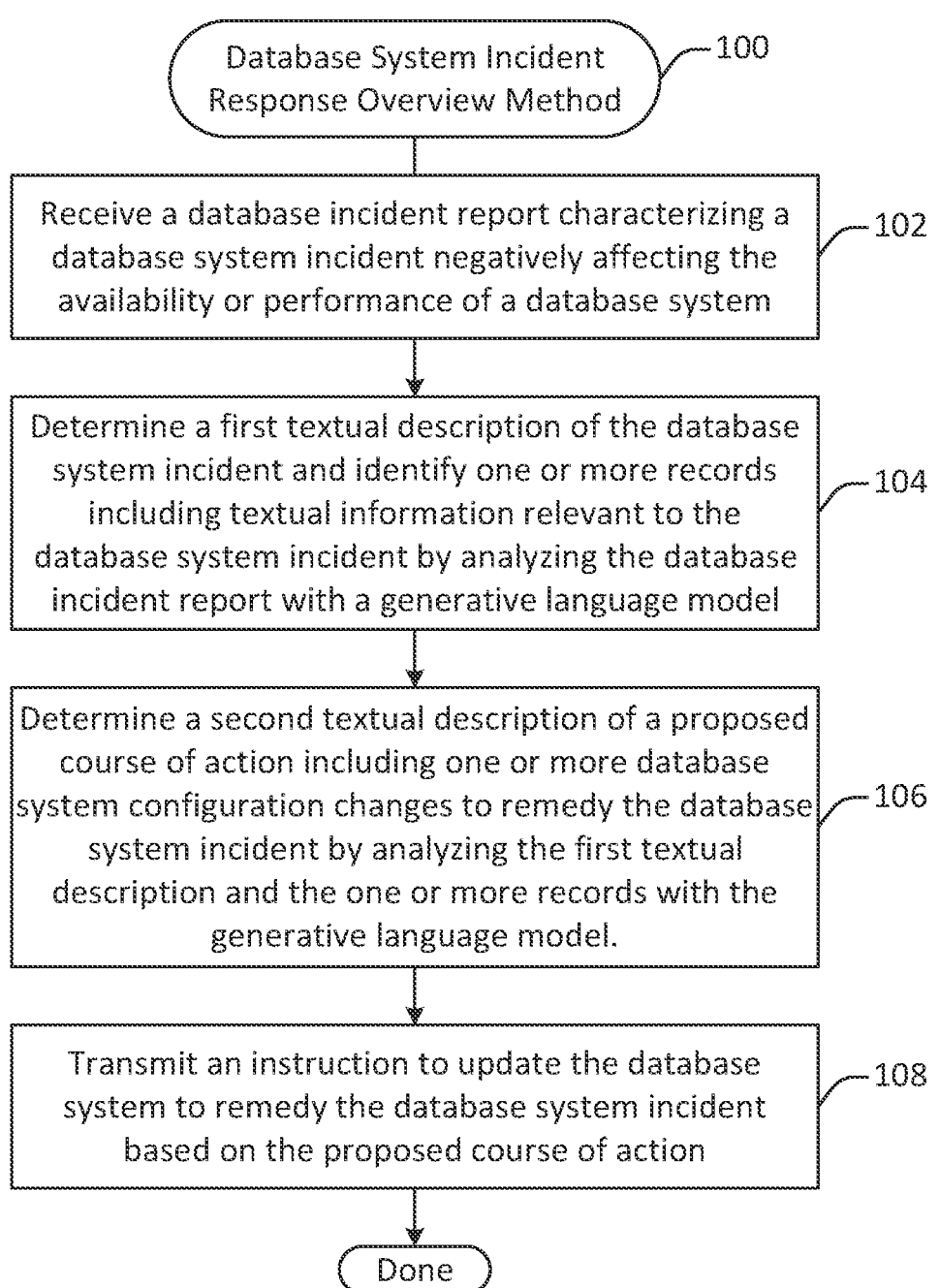

Database System Incident
Response Overview Method —100

Receive a database incident report characterizing a
database system incident negatively affecting the
availability or performance of a database system —102

Determine a first textual description of the database
system incident and identify one or more records
including textual information relevant to the
database system incident by analyzing the database
incident report with a generative language model —104

Determine a second textual description of a proposed
course of action including one or more database
system configuration changes to remedy the database
system incident by analyzing the first textual
description and the one or more records with the
generative language model. —106

Transmit an instruction to update the database
system to remedy the database system incident
based on the proposed course of action —108

Done

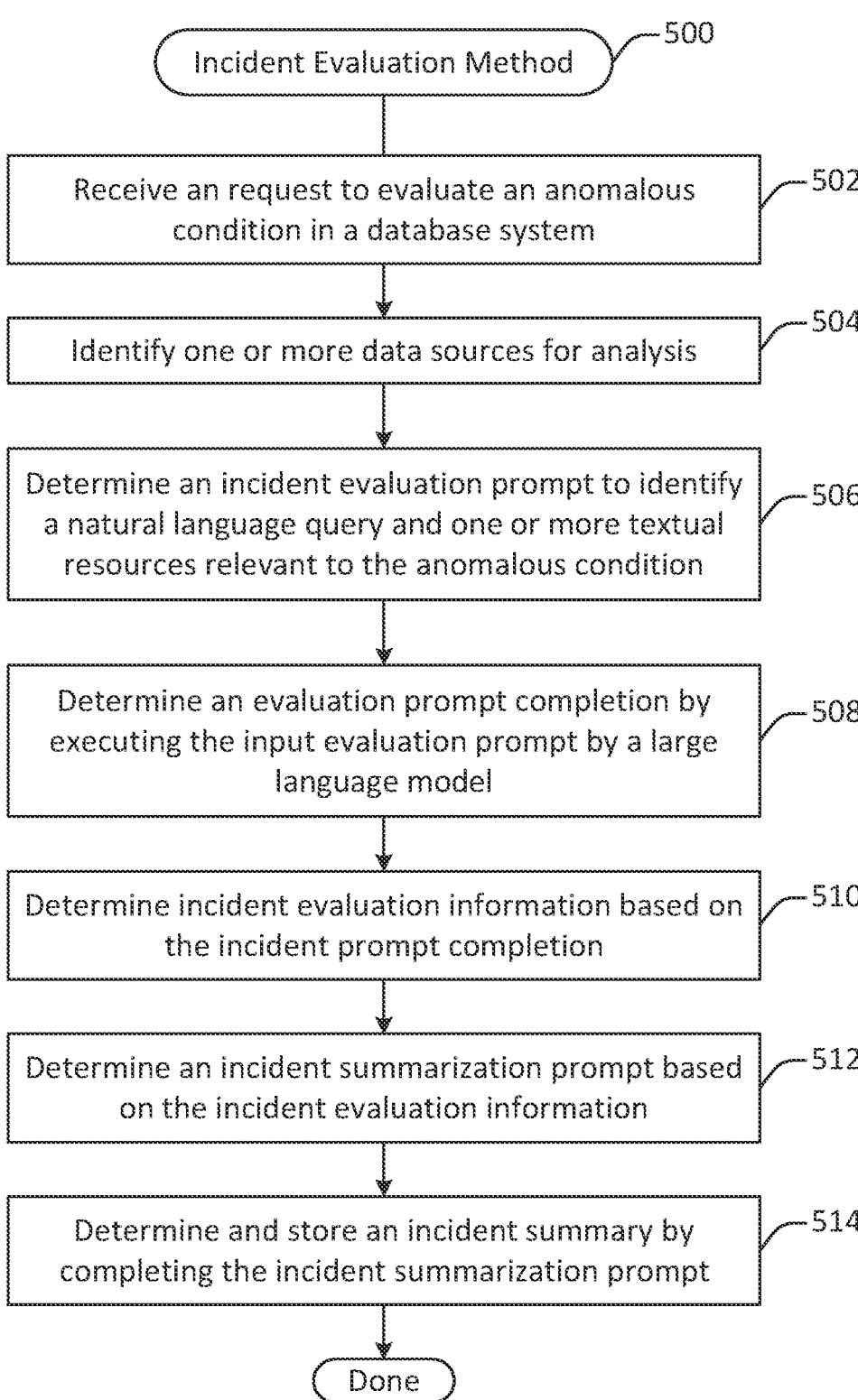

Incident Evaluation Method ⟋500

Receive an request to evaluate an anomalous condition in a database system ⟋502

Identify one or more data sources for analysis ⟋504

Determine an incident evaluation prompt to identify a natural language query and one or more textual resources relevant to the anomalous condition ⟋506

Determine an evaluation prompt completion by executing the input evaluation prompt by a large language model ⟋508

Determine incident evaluation information based on the incident prompt completion ⟋510

Determine an incident summarization prompt based on the incident evaluation information ⟋512

Determine and store an incident summary by completing the incident summarization prompt ⟋514

Done

Figure 5

DATABASE SYSTEM INCIDENT EVALUATION, CLASSIFICATION, AND RESOLUTION SYSTEM

FIELD OF TECHNOLOGY

This patent application relates generally to database systems, and more specifically to database system incident response systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks related to data. One challenge faced in cloud computing environments is service disruption caused by a database incident. Such incidents encompass a broad spectrum of issues, ranging from performance bottlenecks to unexpected outages, making them challenging to troubleshoot.

In an intricate, data-driven landscape, solving database incidents affecting availability often involves identifying and implementing intricate procedures. Identifying and implementing such procedures approach not only leads to extended downtime and heightened service disruptions but also places undue pressure on information technology (IT) teams. Thus, database incidents often lead to chaos, confusion, and frustration for customers and IT teams.

BRIEF DESCRIPTION OF THE DRAWINGS

The included drawings are for illustrative purposes and serve only to provide examples of possible structures and operations for the disclosed inventive systems, apparatus, methods, and computer program products for database system incident response. These drawings in no way limit any changes in form and detail that may be made by one skilled in the art without departing from the spirit and scope of the disclosed implementations.

FIG. 1 illustrates an overview method for responding to a database incident, performed in accordance with one or more embodiments.

FIG. 5 illustrates a method of evaluating a database incident, performed in accordance with one or more embodiments.

DETAILED DESCRIPTION

Figure 2:
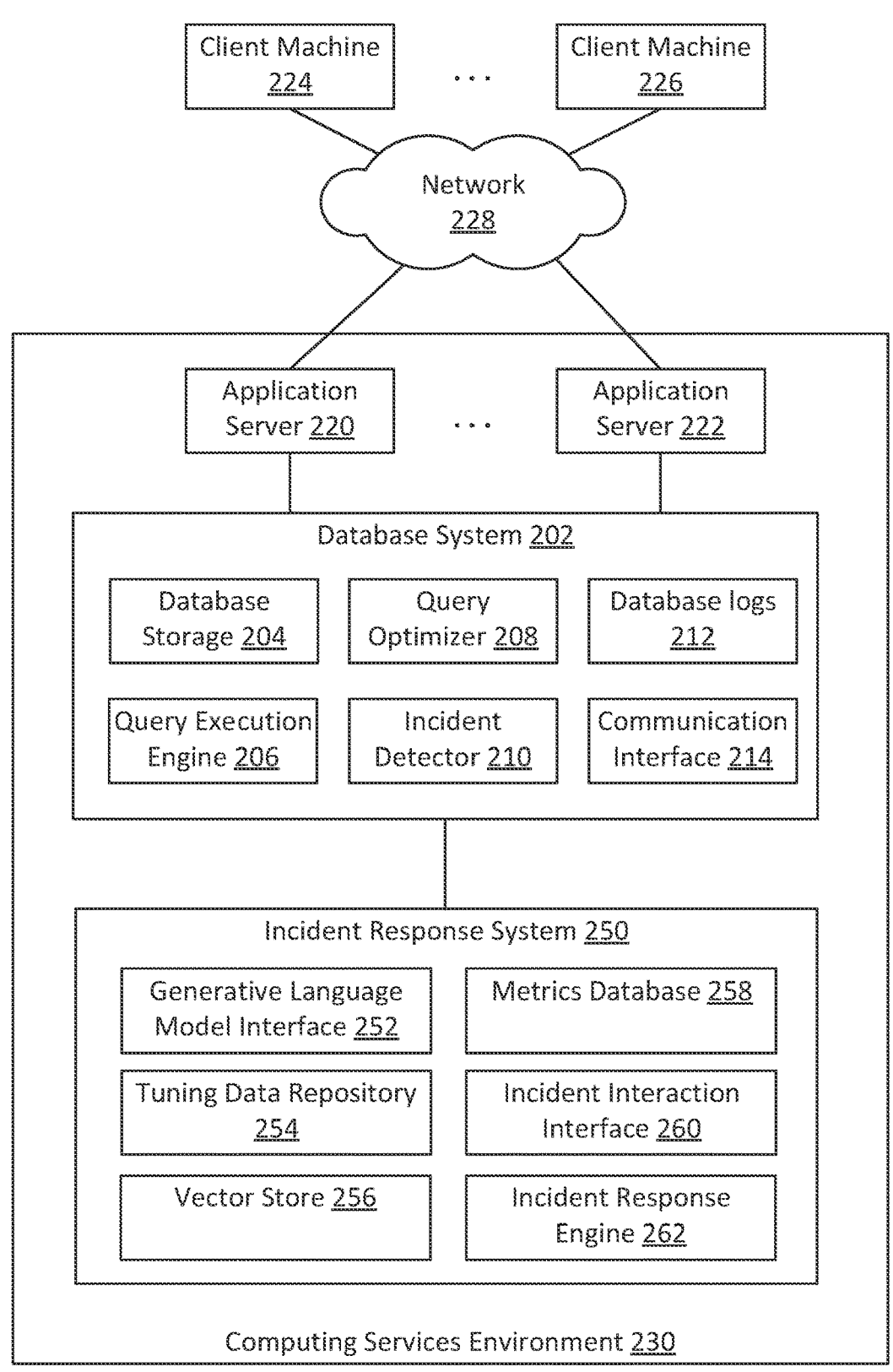
FIG. 2 illustrates a computing services system, configured in accordance with one or more embodiments.

In today's data-driven landscape, ensuring continuous accessibility and rapid incident resolution across various database technologies has become indispensable. Techniques and mechanisms described herein provide novel approaches to incident response procedures. When a database incident is detected, a generative language model may be used to generate a preliminary incident analysis that includes a summary of the incident's details, such as the error messages, symptoms, and any relevant logs or reports. The generative language model may then be used interactively to provide insights on potential causes or solutions, draft messages for communicating information related to the incident, generate structured incident logs or reports, define swimlanes that categorize and assign tasks for resolving the incident, create or update scripts and playbooks for resolution procedures.

Conventional approaches to database incident response are often tailored to particular database systems and do not work across different systems due to reliance on database-specific technologies. In contrast, various embodiments described herein are broadly applicable across a wide spectrum of database, rendering them a versatile solution for contemporary IT environments. Leveraging the capabilities of language models, these mechanisms and techniques may be used to intelligently evaluate and address database incidents, irrespective of the underlying technology, thus streamlining incident management.

Conventional approaches to database incident response are often specific to database systems configured to store data for a single database tenant. In contrast, various embodiments described herein are broadly applicable to both single tenant and multitenant environments. By leveraging AI, this innovative approach not only handles incidents but also devises intelligent strategies to provide tailored solutions for different tenants. This systematic and methodical approach addresses incidents comprehensively, including incident prioritization, stakeholder communication, incident documentation, delineation of tenant-specific swimlanes in multitenant database systems, and the creation of runbooks and procedures for seamless incident management. In doing so, such embodiments effectively help to reduce downtime and disruptions, thus improving the functioning of the database system itself.

Conventional approaches to database incident response focus on one or a few elements involved in responding to a database incident, leaving many other elements undone and requiring significant manual intervention. In contrast, various embodiments described herein offer a holistic approach, encompassing initial incident prioritization, stakeholder communication, incident documentation, swimlane definition, and the creation of comprehensive runbooks that include operational guidelines and protocols. This comprehensive approach provides a broadly applicable solution to the intricate challenges of incident response in today's dynamic data landscape. Such broad applicability provides a valuable and adaptable asset for organizations seeking efficient, database-agnostic, and/or multitenant-capable incident response solutions.

FIG. 1 illustrates an overview method 100 for responding to a database incident. According to various embodiments, the method 100 may be implemented in one or more components of a computing services system such as the computing services system 200 shown in FIG. 2. For instance, the overview method 100 may be implemented in the incident response system 250.

A database incident report characterizing a database system incident negatively affecting, or having the potential to negatively affect, the availability and/or performance of a database system is received at 102. In some embodiments, the database incident report may be generated by an incident detector monitoring the database system operation, performance, and availability.

In some embodiments, the incident detector may identify the database system incident by, for instance, observing characteristics such as database request response latency, a rate of dropped database request messages, or other such indicators of database system availability or performance. When such characteristics deviate from acceptable ranges, and/or when the incident detector predicts that such indicators are likely to deviate from acceptable ranges in the future, the incident detector may generate an incident report.

At 104, a first textual description of the database system incident is determined, and one or more records including textual information relevant to the database system incident are identified, by analyzing the database incident report with a generative language model. In some embodiments, the one or more records may be located in a vector store accessible to the generative language model.

In some embodiments, determining the first textual description and/or identifying the one or more records may involve generating a prompt based on a prompt template. Both the prompt and the prompt template may include a natural language instruction that is executable by the generative language model to determine the first textual description and identify the one or more records. The prompt template may include a fillable portion that may be filled with information included in the database system incident report and/or other suitable information. Additional details regarding determining the first textual description and identifying the one or more records are discussed with respect to the method 500 shown in FIG. 5. The language model may be pre-tuned using a method such as the method 400 shown in FIG. 6.

At 106, a second textual description of a proposed course of action including one or more database system configuration changes to remedy the database system incident is determined by analyzing the first textual description and the one or more records with the generative language model. An instruction to update the database system to remedy the database system incident based on the course of action is transmitted at 108. In some embodiments, determining the second textual description may involve determining one or more prompts to be completed by the generative language model. One or more such prompts may be generated interactively, for instance based on user input received via a communication interface. Additional details regarding the determination and execution of the proposed course of action are discussed with respect to the method 600 shown in FIG. 6.

FIG. 2 illustrates a computing services system 200, configured in accordance with one or more embodiments. The computing services system 200 includes one or more client machines 224 through 226 in communication with a computing services environment 230 via a network 228. The computing services environment 230 includes one or more application servers 220 through 222, a database system 202, and an incident response system 250. The database system 202 includes database storage 204, a query execution engine 206, a query optimizer 208, an incident detector 210, database logs 212, and a communication interface 214. The incident response system 250 includes a generative language model interface 252, a tuning data repository 254, a vector store 256, a metrics database 258, an incident interaction interface 260, and an incident response engine 262.

According to various embodiments, the one or more application servers 220 through 222 may provide any of various types of web-accessible computing applications to the client machines 224 through 226 via the network 228. For example, the web-accessible computing applications may include applications related to customer relations management, social networking, sales management, generative artificial intelligence, data storage, and/or other types of applications. Providing such applications may involve storing information to and retrieving information from the database system 202.

In some implementations, data stored in the database system 202 may be stored in the database storage 204, which may include one or more tables storing data for database tenants. Access to the data stored in the database storage 204 may be provided via the query execution engine 206, which may execute queries to store data to the database system 202 and/or retrieve data from the database system 202. Such queries may be determined by the query optimizer 208, which may receive requests from the application servers 220 through 222 and determine queries to be executed by the query execution engine 206. Communication with the database system 202 may be conducted via the communication interface 214.

According to various embodiments, the incident detector 210 monitors the operation of the database system 202 to detect database incidents. A database incident may be any event or condition that negatively affects, or has the potential to negatively affect, the operation or availability of the database system 202. Information characterizing the operation of the database system 202 may be stored in the database logs 212.

In some embodiments, the database system 202 may be a multitenant database system. However, the techniques and mechanisms described herein are not limited to multitenant database systems, and instead are broadly applicable across various types and configurations of database systems. Moreover, the term "tenant" as used herein does not imply that a database system is necessarily "multitenant". For example, depending on the configuration, information for different tenants may be stored in different database tables or the same database table in accordance with techniques and mechanisms described herein.

According to various embodiments, the incident response system 250 may communicate with the 202 to monitor the operation of the database system 202. The incident response system 250 may receive indications of incidents identified by the incident detector 210, as well as other information such as data stored in the database logs 212. Such information may be stored in the metrics database 258. The incident response engine 262 may process such information in conjunction with user input received via the incident interaction interface 260 to respond to the incident.

In some embodiments, responding to the incident may involve determining incident response information based on interactions with a generative language model via the generative language model interface 252. The generative language model may be tuned based on the information stored in the vector store 256 to generate novel text used by the incident response engine 262 to determine the incident response information.

In some embodiments, conducting interactive incident response may involve receiving interactive input via an interface such as the incident interaction interface 260. For example, the incident interaction interface 260 may present database information and/or information determined based on a generative language model to one or more users, such as systems administrators. The incident interaction interface 260 may then receive text-based input from those users. For instance, the users may provide input via a chat-based interface, such as a channel in a text messaging service such as Salesforce Slack or Microsoft Teams. The incident response engine 262 may then process such input to perform operations such as transmitting one or more prompts to a generative language model and determining one or more actions to take based on output provided by the generative language model.

Figure 3:
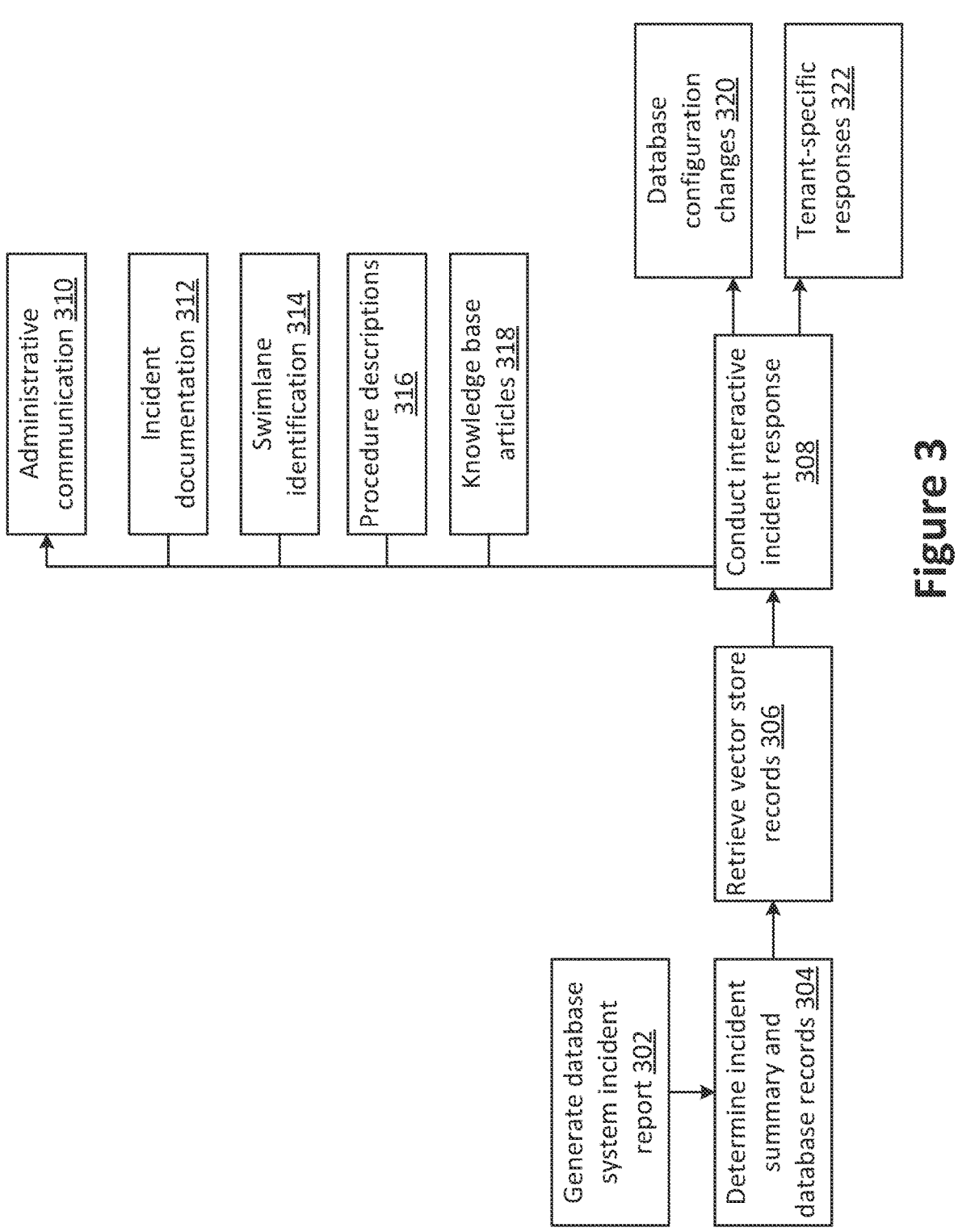
FIG. 3 illustrates a workflow performed in accordance with one or more embodiments.

According to various embodiments, additional details regarding a workflow for determining a response to an incident are discussed with respect to the flow 300 shown in FIG. 3. A process for determining the tuning data stored in the tuning data repository 254 is discussed with respect to the method 400 shown in FIG. 4. Techniques for evaluating and responding to an incident are discussed with respect to the methods 500 and 600 shown in FIG. 5 and FIG. 6.

In some embodiments, one or more of the elements shown in FIG. 2 may be divided across potentially many physical devices. For example, a computing services environment may include potentially may application servers accessing database storage systems organized across many physical devices.

FIG. 3 illustrates a workflow 300 performed in accordance with one or more embodiments. The workflow 300 illustrates various types of operations that may be performed during incident response.

A database system incident report is generated at 302. An incident summary is determined and one or more relevant vector store records are determined at 304. The vector store records are retrieved from the vector store at 306. In some embodiments, one or more vector store records may be retrieved in advance and then provided to the generative language model. Alternatively, or additionally, one or more vector store records may be accessed directly by the generative language model.

At 308, interactive incident response is conducted. In some embodiments, as discussed with respect to the incident interaction interface 260 shown in FIG. 2, incident information may be presented to one or more users such as systems administrators. Those users may then provide interactive feedback, which may then be used to refine the incident information. For instance, the users may determine and/or execute a course of action with the aid of the generative language model by providing information to the incident interaction interface 260. Examples of the types of interactions that may be accomplished using text determined by the generative language model are discussed in the following paragraphs.

In some embodiments, the system may receive user input and use that user input to generate novel text via the generative language model to build a more comprehensive view of the database incident. For instance, a user may request insights on potential causes or solutions by providing textual input such as "What could be causing database errors with error code XYZ?" The generative language model may then determine a response to the question based on the tuning data and the vector store records retrieved at 306.

In some embodiments, the incident response system 250 may determine administrative communication 310 with one or more database system supervisors that includes information such as a brief summary of the database incident and progress being made to solve it.

In some implementations, the incident response system 250 may generate incident documentation 312 via the generative language model. The incident documentation 312 may include documents such as structured incident logs or reports, incident timelines, descriptions of actions taken, and descriptions of resolutions achieved. To generate such documents, information such as key details, actions taken, and/or system outcomes may be provided to the generative language model, along with a natural language request to format this information into a log or report template.

In some embodiments, the incident response system 250 may determine swimlanes for handling the incident. Swimlanes refers to the grouping of ordered tasks according to role, individual, or other such categories to effectively organize the execution of such tasks. To generate such swimlanes, information such as key details, tasks to be completed, and role descriptions may be provided to the generative language model, along with a natural language request to use this information to identify a correspondence between tasks and roles.

In some embodiments, the incident response system 250 may determine descriptions of procedures for handling incidents. Such descriptions may describe the operations that need to be performed to address a database incident, such as database recovery procedures, restarting services, failover operations, and the like. To generate such procedure descriptions, information such as a description of the incident and tasks completed to resolve the incident may be provided to the generative language model, along with a natural language request to format this information into a description of the procedures to execute.

In some embodiments, the incident response system 250 may determine or update knowledge base articles. Knowledge base articles may include information such as database system incident descriptions, descriptions of database incident causes, and descriptions of database incident solutions. Such information may be used to enhance the system's knowledge base, improving future incident responses. For instance, knowledge base articles may be stored in the vector store 256.

In some embodiments, the incident response system 250 may identify one or more database configuration changes to implement at 230. Such configuration changes may include increasing computing resources, restarting one or more services, dropping one or more disks, or performing other such operations.

In some embodiments, the incident response system 250 may determine one or more tenant-specific responses 322. Tenant-specific responses may include, for instance, different messages generated for different tenants using the same database system. Alternatively, or additionally, tenant-specific responses may include tenant-specific procedures. For instance, data for a particular tenant may be moved from one portion of the database system to another.

In some embodiments, tenant-specific responses may be determined by identifying and segregating data related to different tenants, allowing incidents to be managed separately for different tenants. Moreover, the generative language model may be tuned to determine output based on the unique context of different tenants, allowing tailored incident response strategies.

Figure 4:
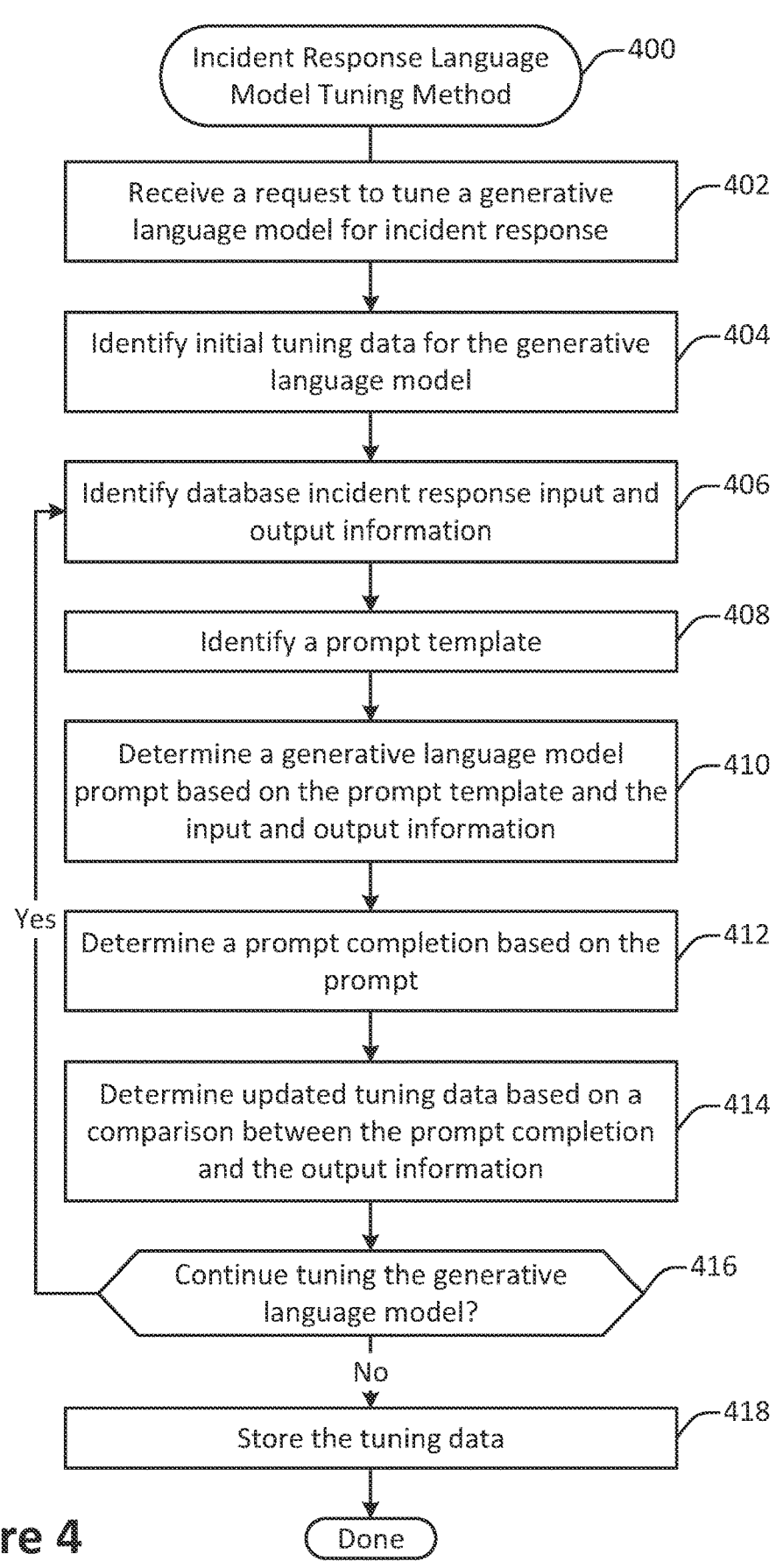
FIG. 4 illustrates a method for tuning a generative language model for incident response, performed in accordance with one or more embodiments.

FIG. 4 illustrates a method 400 for tuning a generative language model for incident response, performed in accordance with one or more embodiments. In some embodiments, the method 400 may be performed at one or more computing devices in a computing services environment. For instance, the method 400 may be performed at the incident response system 250 shown in FIG. 2.

According to various embodiments, the method 400 may be performed in order to determine tuning data to tune a general-purpose large language model for the generation of language in the context of database system incident response. Such tuning may be performed for a particular computing environment and/or database system so that the model is tuned for a particular context. The method 400 may be implemented to allow the system to incorporate feedback from incident resolutions, learning and optimizing its algorithms for better future responses.

A request to tune a generative language model for incident response is received at 402. In some implementations, the request may be generated periodically. For example, the generative language model may be tuned once per week or according to some other cadence. As another example, the generative language model may be tuned upon the detection of a triggering condition, such as the resolution of a database incident or upon the receipt of a request from a systems administrator.

Initial tuning data for the generative language model is identified at 404. In the event that the generative language model has been tuned before, then the initial tuning data may include tuning data stored from one or more previous tuning iterations. Alternatively, if the generative language model has not yet been tuned for incident detection, then the tuning data may be initialized with default weights.

Database incident response input and output information is identified at 406. According to various embodiments, the database incident response input and output information may include data from real-world incidents, allowing the system to adapt to evolving database technologies and incident patterns. Examples of such data include database metrics stored in the metrics database 258, actions taken to resolve database incidents, knowledge base articles, information from the vector store 256, and/or text information generated during the course of resolving a database incident.

A prompt template is identified at 408. In some embodiments, the prompt template may include one or more natural language instructions executable by a large language model to determine novel text related to database incident response. For instance, the prompt template may include a natural language instruction to "Determine a response to the following query by a database systems administrator based on the included database system incident information." Additionally, the prompt template may include one or more fillable portions (e.g., <incident information>, <administrator query>) that may be filled at runtime with information determined dynamically based on the incident and the incident response handling.

According to various embodiments, different types of input and output information may be associated with different prompt templates. For example, an initial prompt template may include a natural language instruction to summarize an incident based on an incident report and to identify one or more relevant records stored in a vector store. As another example, a documentation generation prompt may include various natural language instructions characterizing factors such as formatting requirements for the documentation to be generated.

A generative language model prompt is determined at 410 based on the prompt template and the input and output information. In some embodiments, determining the generative language model prompt may involve filling the one or more fillable portions of the prompt template with the input information determined at 406.

A prompt completion is determined at 412 based on the prompt. In some implementations, the prompt completion may be determined by providing the prompt to the generative language model interface 252. The generative language model may then execute the natural language instructions included in the prompt to determine novel text based on the input information included in the prompt.

Updated tuning data is determined at 414 based on a comparison between the prompt completion and the output information. For example, in the event that the prompt includes a request to generate documentation based on the input data, the generated documentation may be compared with corresponding documentation in the output data. In this way, the language model may be tuned to generate documentation mirroring that generated by humans in the course of manual database incident management. As another example, in the event that the prompt includes a request to determine text identifying a recommended course of action, the recommended course of action may be compared with an actual action that was taken to resolve the real-world database incident. In this way, the generative language model may be tuned to determine a recommended course of action that mirrors that determined by human experts in the course of resolving real-world database incidents.

A determination is made at 416 as to whether to continue tuning the generative language model. In some embodiments, the determination may be made at least in part based on the comparison made at 414. For instance, tuning may continue while a difference between the output information and information included in the prompt completion exceeds a designated threshold.

Upon determining not to continue tuning the generative language mode, the tuning data is stored at 418. In some embodiments, the tuning data may be stored as discussed with respect to FIG. 2, in the tuning data repository 254 within the incident response system 250. The stored tuning data may then be used to evaluate incident data as discussed with respect to the methods 500 and 600 shown in FIG. 5 and FIG. 6.

FIG. 5 illustrates a method 500 of evaluating a database incident, performed in accordance with one or more embodiments. In some embodiments, the method 500 may be performed at a computing services environment such as the computing services environment 230 shown in FIG. 2. The method 500 may correspond to one or all of operations 102 through 106 shown in FIG. 1.

A request is received at 502 to evaluate an anomalous condition in a database system. According to various embodiments, the request received at 502 may be associated with the generation of a database incident report, such as the report discussed with respect to the operation 302.

In some embodiments, such a request may be generated automatically by the database system itself. For instance, the database system may generate such a request when one or more parameters falls outside of a predetermined range.

In some embodiments, such a request may be generated by the incident response system 250. For instance, the database system may periodically send logs, metrics, and/or other such information to the incident response system 250. The incident response system 250 may then analyze such information, for instance with a prediction model trained on historical data, to determine whether the database system is likely to enter an anomalous state in the future.

In some embodiments, such a request may be generated based on user input. For instance, a systems administrator may identify the database system as being in an anomalous state and transmit an instruction to generate an incident report.

One or more data sources are identified for analysis at 504. According to various embodiments, the one or more data sources may include any or all of the information discussed herein, for instance with respect to FIG. 2. For example, the data sources may include an incident report generated by the database system 202, one or more logs stored in the database logs 212, one or more metrics stored in the metrics database 258, and/or any other suitable information.

An incident evaluation prompt is determined at 506. In some implementations, the incident evaluation prompt may include one or more natural language instructions to be executed by a large language model. The one or more natural language instructions may instruct the large language model to identify both a natural language query and one or more textual resources relevant to the anomalous condition. Thus, the incident evaluation prompt may correspond to operation 304 shown in FIG. 3, in which a first prompt sent to a generative language model serves to determine instructions and data records for generating one or more second, more comprehensive prompts.

In some embodiments, the incident evaluation prompt may also include dynamically generated input information associated with the database incident identified at 502. For instance, the incident evaluation prompt may include all or a portion of the information in a database incident report generated by the database system.

An evaluation prompt completion is determined at 508 by executing the incident evaluation prompt by a generative language model. Executing the incident evaluation prompt may involve transmitting the incident evaluation prompt to the generative language model via the generative language model interface 252. The generative language model may then respond with a prompt completion that includes novel text generated responsive to the natural language instructions and database incident input information included in the incident evaluation prompt.

Incident evaluation information is determined at 510 based on the incident prompt completion. The incident evaluation information may be determined by extracting novel text generated by the generative language model from the incident prompt completion.

In some embodiments, the incident evaluation information may include a natural language query for summarizing a database incident. For instance, the incident evaluation information may include a natural language request such as "Please identify the most likely causes of database error 5621 based on the following database incident report, database metrics, and knowledge articles."

In some embodiments, the incident evaluation information may include one or more identifiers corresponding to entries stored in the vector store 256. Such entries may include natural language text such as knowledge articles, incident response procedures, and/or other records. Some such records may be manually generated. Alternatively, or additionally, some such records may be generated by a generative language model, for instance in response to a prior database incident. The generation of such records is discussed in additional detail with respect to the method 600 shown in FIG. 6.

An incident summarization prompt is determined at 512 based on the incident evaluation information. According to various embodiments, the incident summarization prompt may be determined by filling one or more portions of an incident summarization prompt template with information determined at 510 and/or 504. For example, the incident summarization prompt may include a natural language query to summarize a database incident. The natural language query may be determined as discussed with respect to the operation 510. The incident summarization prompt may also include supporting information to be used in executing the natural language query. Such information may include one or more vector store entries, database metrics, information from database logs, and/or information from a database incident report.

An incident summary is determined at 514 by completing the incident summarization prompt. Completing the incident summarization prompt may involve transmitting the incident summarization prompt to a generative language model via the generative language model interface 252, and then receiving a summarization prompt completion that includes novel text generated by the generative language model. The novel text may include, for instance, a description of possible causes and/or solutions for the database incident, depending on the content of the natural language query and the supporting information.

Figure 6:
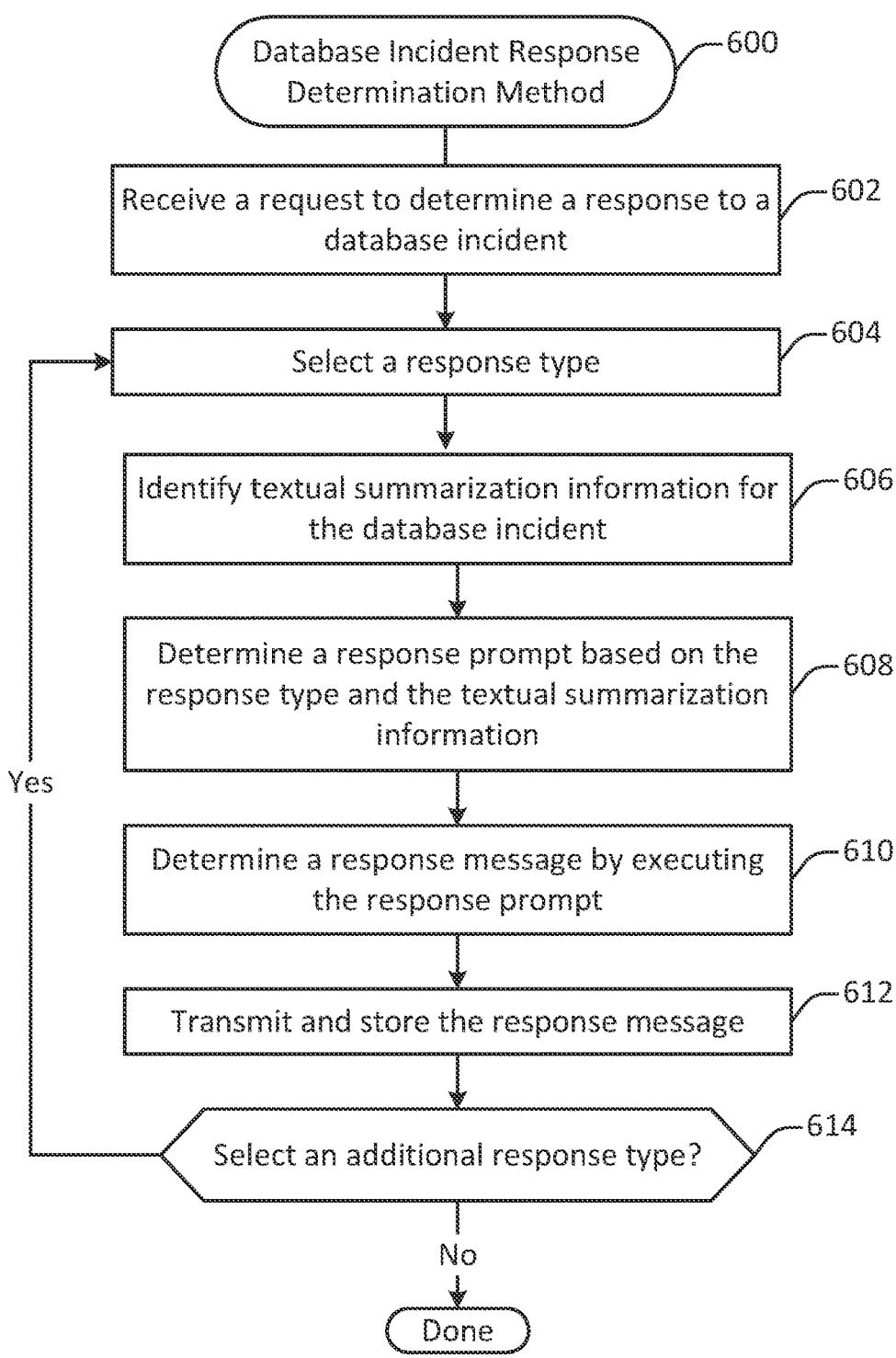
FIG. 6 illustrates a method of determining a response to a database incident, performed in accordance with one or more embodiments.

FIG. 6 illustrates a method 600 of determining a response to a database incident, performed in accordance with one or more embodiments. In some embodiments, the method 600 may be used to determine and execute a course of action to address a database incident. Thus, the method 600 may correspond to operations 106 and 108 shown in FIG. 1. Alternatively, or additionally, the operations shown in FIG. 6 provide a more detailed view of the operations 512 and 514 shown in FIG. 5.

A request to determine a response to a database incident is received at 602. In some embodiments, the request may be generated based on information determined as discussed in the method 500 shown in FIG. 5. For instance, the request may be automatically generated when an incident summary is determined.

In some embodiments, the request may be generated based on user input. For instance, when a database incident is detected, an incident response channel may be opened in a communication platform such as Salesforce Slack or Microsoft Teams. Then, one or more users such as systems administrators may join the channel. A user may then provide user input indicating a request to determine a response to the database incident.

A response type is selected at 604. According to various embodiments, the response type may correspond to one or more output elements of the interactive incident response 308 shown in FIG. 3. For instance, the response type may be a database configuration change to address the incident, one or more tenant-specific responses, an identification of swim-lanes, a description of a solution procedure, an administrative communication a knowledge base article, or the like.

In some embodiments, a response type may be identified automatically. For instance, the identification of a database incident as solved by a systems administrator may automatically trigger the determination of an administrative communication or a summary of the incident solution.

In some embodiments, a response type may be identified based on user input. For instance, a systems administrator may provide natural language input via the communication channel instructing the system to determine a database configuration change to address the incident.

Textual input information for the database incident is identified at 604. In some embodiments, the textual input information may include textual summarization information determined as discussed with respect to the method 500 shown in FIG. 5. Alternatively, or additionally, the textual input information may be information determined in a previous iteration of operations 604-614. For example, the textual input information may include an incident response procedure determined by the generative language model. As another example, the textual input information may include natural language user input received from systems administrators via the communication channel.

In some embodiments, the textual input information may include information received from outside sources such as stakeholders. For instance, the system may automatically generate text for communicating with stakeholders, for instance via email or a chat interface. Then, the system may incorporate natural language responses provided by those stakeholders into input for determining future responses. For example, sentiment analysis may be performed on stakeholder responses to gauge their sentiment, helping to ensure appropriate responses and resolutions.

A response prompt is determined at 608 based on the response type and the textual summarization information. In some embodiments, the response prompt may include a natural language instruction to generate text responsive to the response type and based on the summarization information. For instance, the response prompt may include a natural language instruction to generate a procedure description, identify swimlanes, determine incident documentation, or generate other output such as that discussed with respect to FIG. 3.

In some embodiments, the response prompt may also include some or all of the textual summarization information identified at 606. The response prompt may be created by filling one or more fillable portions of a prompt template corresponding with the response type with the textual summarization information identified at 606.

A response message is determined at 610 by completing the response prompt. The response prompt completion may be determined by the tuned generative language model by sending the response prompt to the generative language model via the generative language model interface 252. The generative language model may then complete the prompt by executing the natural language instructions in the response prompt to generate novel text responsive to the natural language instructions. For example, the novel text may correspond to text to include in a procedure description, knowledge base article, incident documentation record, or the like. As another example, the novel text may correspond to an instruction to implement a database configuration change executable by the database system.

The response message is transmitted and stored at 612. According to various embodiments, the destination of the response message may depend on the response type.

In some embodiments, for instance in the event that the response type is a configuration change intended to resolve the database incident, the response message may be sent to the database system itself. In such a situation, the response message may include an instruction executable by the database system to update a configuration setting in the database system. Such a setting may involve, for instance, changing a number and/or type of database connections, changing an amount of traffic processed by the database system, changing an amount of computing resources available to the database system, adding or dropping a database table, adding a dropping a replica node, adding or dropping a hardware server, and/or any other configuration changes.

In some embodiments, for instance in the event that the response type involves stakeholder communications, the response message may be transmitted to a stakeholder, for example via an email or chat interface. The response message may then include information such as real-time or near real-time incident update and resolution information.

A determination is made at 614 as to whether to select an additional response type. In some embodiments, the determination may be made based on user input received via the communication channel. For instance, additional responses may continue to be determined until a triggering condition is detected, such as a systems administrator supplying user input indicating that the database incident is resolved.

Figure 7:
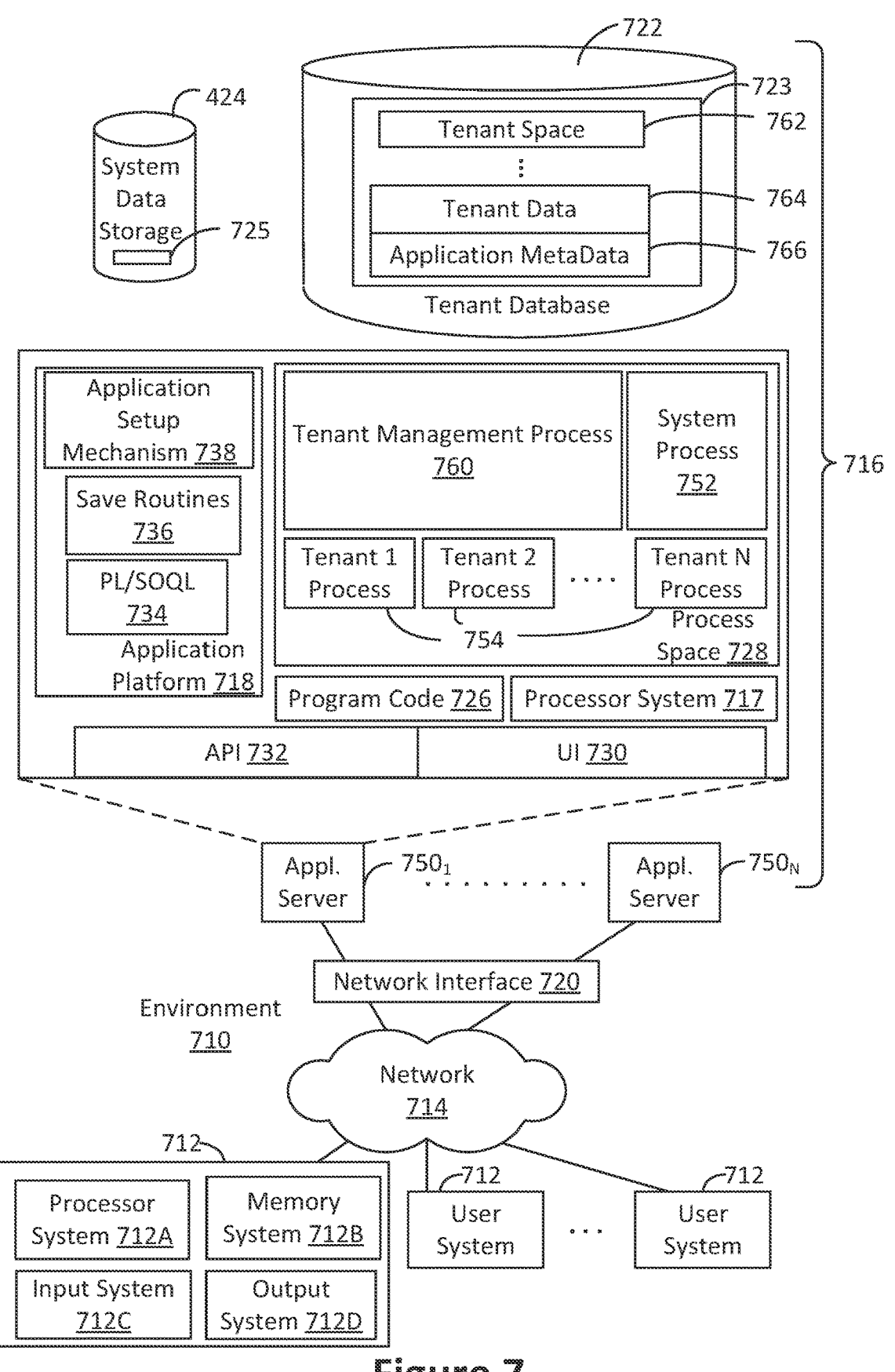
FIG. 7 shows a block diagram of an example of an environment that includes an on-demand database service configured in accordance with some implementations.

FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 718 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based incident interaction interface system. For example, in some implementations, system 716 may include application servers configured to implement and execute incident response software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figures 8A, 8B:
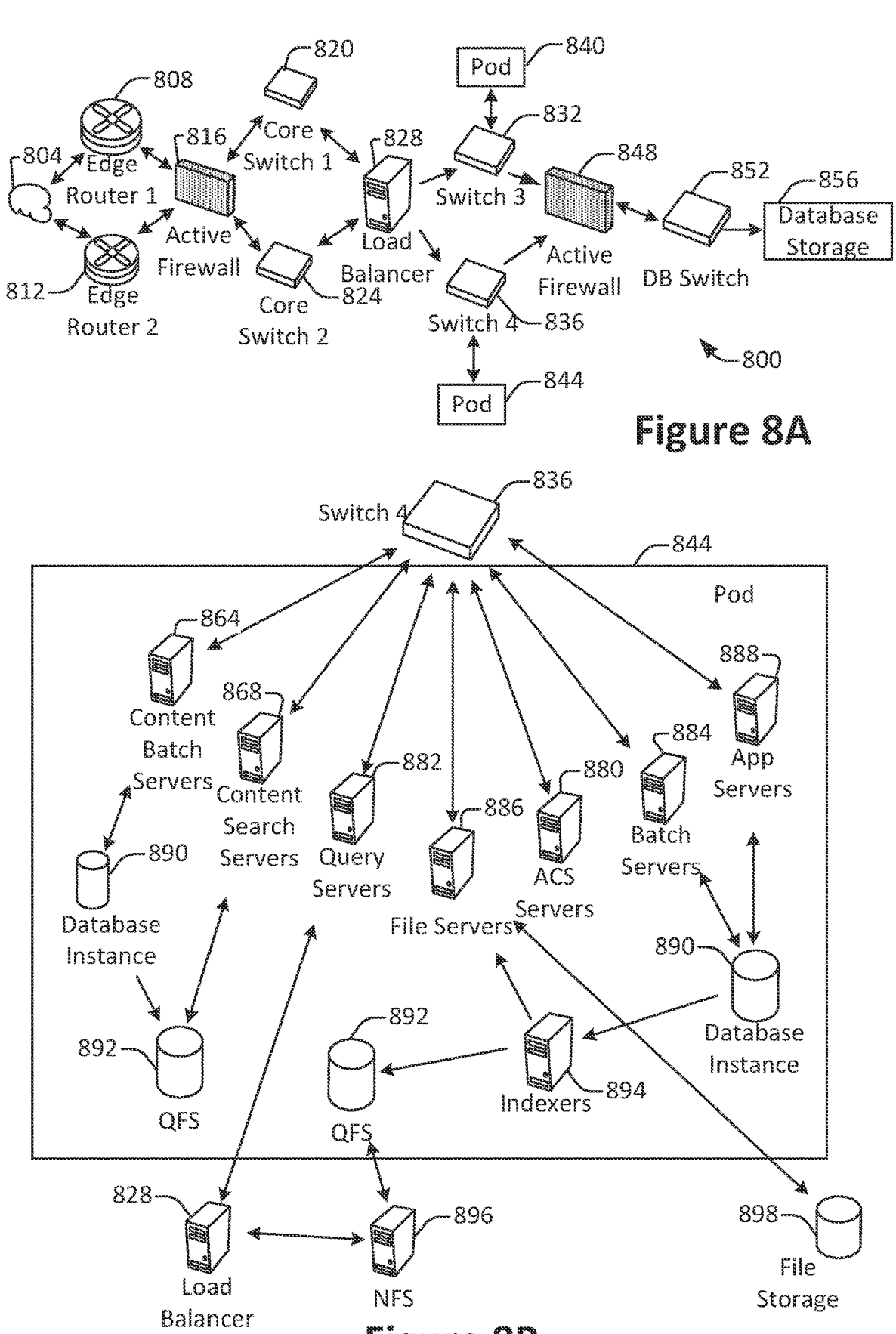
FIG. 8A shows a system diagram of an example of architectural components of an on-demand database service environment, configured in accordance with some implementations.
FIG. 8B shows a system diagram further illustrating an example of architectural components of an on-demand database service environment, in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems 712 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process incident detection and response information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
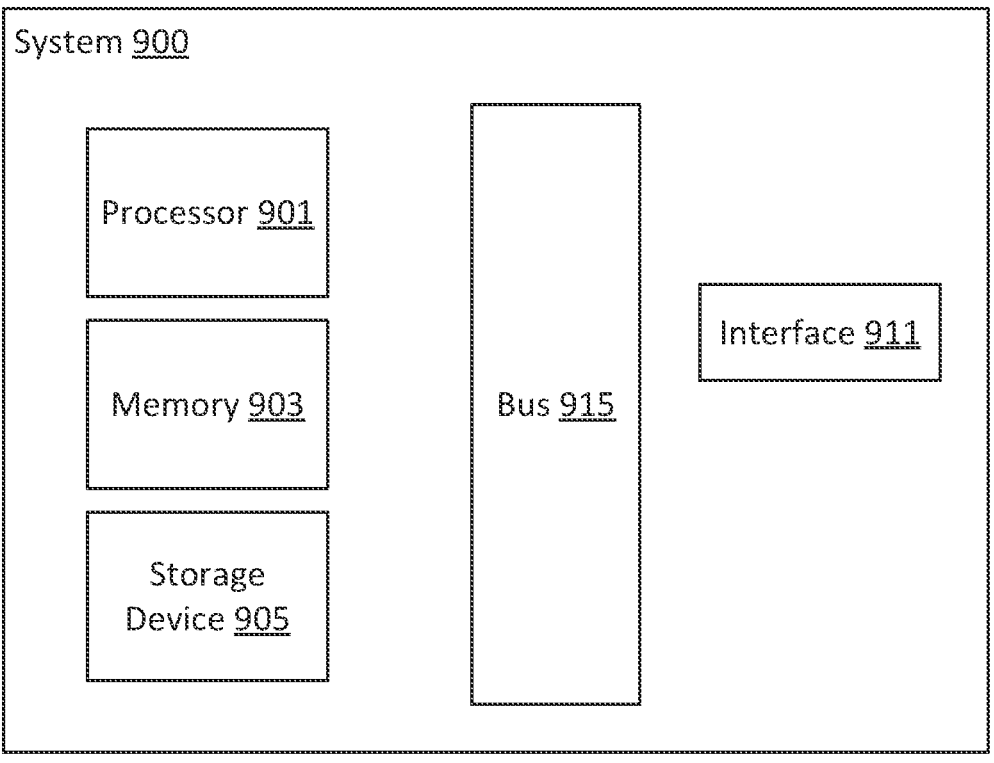
FIG. 9 illustrates one example of a computing device configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of multi-tenant database systems. However, the techniques disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A computing services environment including a hardware processor and memory, the computing services environment comprising:

a database system including one or more database tables storing a plurality of database records, the database system configured to detect a database system incident affecting database system availability or performance and to generate a database incident report characterizing the database system incident;

a metrics database storing database metrics characterizing operation of the database system;

a vector store storing a plurality of records including textual information characterizing information related to a plurality of database incidents;

a generative language model interface configured to determine a textual description of the database system incident and identify one or more records of the plurality of records by completing an incident evaluation prompt via a generative language model, the incident evaluation prompt including some or all of the database incident report, the incident evaluation prompt including a subset of the database metrics retrieved from the metrics database, the incident evaluation prompt also including a natural language instruction executed by the generative language model to generate the textual description based on the subset of the database metrics; and an incident response engine configured to determine an instruction to resolve the database incident based on the textual description and the one or more records, the instruction to resolve the database incident being determined based on novel text generated by the generative language model and identifying a database configuration change executable by the database system to update one or more configuration parameters, the generative language model being tuned to determine the database configuration change based on tuning data characterizing responses to prior database incidents affecting the database system.

2. The computing services environment recited in claim 1, wherein the incident response engine is further configured to generate incident documentation text documenting the database incident.

3. The computing services environment recited in claim 1, wherein the incident response engine is further configured to generate a message characterizing the database incident and transmitted to a database system tenant via a chat interface.

4. The computing services environment recited in claim 1, wherein the incident response engine is further configured to generate a database incident procedure description characterizing a process for resolving the database incident.

5. The computing services environment recited in claim 1, wherein the instruction to resolve the database incident is determined at least in part based on user input including natural language received via an incident interaction interface including a chat interface.

6. The computing services environment recited in claim 1, wherein the instruction to resolve the database incident includes an allocation of database configuration change tasks to one or more individuals.

7. The computing services environment recited in claim 1, wherein the database system is a multitenant database storing information associated with a plurality of database system tenants, and wherein the incident response engine is further configured to generate and transmit a plurality of tenant-specific response messages.

8. The computing services environment recited in claim 1, wherein determining the instruction to resolve the database incident comprises determining a response prompt completion via the generative language model, the response prompt completion including novel text specifying the instruction.

9. The computing services environment recited in claim 1, wherein the plurality of database records correspond to information generated during the execution of an application server providing access to one or more web applications to a plurality of client machines via the internet.

10. The computing services environment recited in claim 1, wherein the generative language model is tuned based on tuning data stored in a tuning data repository.

11. The computing services environment recited in claim 10, wherein the tuning data includes historical data characterizing responses to prior database incidents affecting the database system.

12. A method implemented in a computing services environment including a hardware processor and memory, the method comprising:

detecting via a processor a database system incident affecting availability or performance for a database system storing a plurality of database records;

generating a database incident report characterizing the database system incident;

determining a textual description of the database system incident and identifying one or more records by completing an incident evaluation prompt via a generative language model accessed through a generative language model interface configured to, the incident evaluation prompt including some or all of the database incident report, the incident evaluation prompt including a subset of database metrics retrieved from a metrics database storing database metrics characterizing operation of the database system, the incident evaluation prompt also including a natural language instruction executed by the generative language model to generate the textual description based on the subset of the database metrics, the one or more records being stored in a vector store and including textual information characterizing information related to a plurality of database incidents;

determining an instruction to resolve the database incident based on the textual description and the one or more records, the instruction to resolve the database incident being determined based on novel text generated by the generative language model and identifying a database configuration change executable by the database system; and executing the instruction to update one or more configuration parameters associated with the database system, the generative language model being tuned to determine the database configuration change based on tuning data characterizing responses to prior database incidents affecting the database system.

13. The method recited in claim 12, the method further comprising:

generating and storing incident documentation text documenting the database incident.

14. The method recited in claim 12, the method further comprising:

generating and transmitting a message characterizing the database incident and transmitted to a database system tenant via a chat interface.

15. The method recited in claim 12, the method further comprising:

generating and storing a database incident procedure description characterizing a process for resolving the database incident.

16. The method recited in claim 12, wherein the instruction to resolve the database incident is determined at least in part based on user input including natural language received via an incident interaction interface including a chat interface.

17. The method recited in claim 12, wherein the instruction to resolve the database incident includes an allocation of database configuration change tasks to one or more individuals.

18. The method recited in claim 12, wherein the database system is a multitenant database storing information associated with a plurality of database system tenants, the method further comprising generating and transmitting a plurality of tenant-specific response messages.

19. The method recited in claim 12, wherein the generative language model is tuned based on tuning data stored in a tuning data repository, and wherein the tuning data includes historical data characterizing responses to prior database incidents affecting the database system.

20. One or more non-transitory computer readable media having instructions stored thereon for performing a method implemented in a computing services environment including a hardware processor and memory, the method comprising:

detecting via a processor a database system incident affecting availability or performance for a database system storing a plurality of database records;

generating a database incident report characterizing the database system incident;

determining a textual description of the database system incident and identifying one or more records by completing an incident evaluation prompt via a generative language model accessed through a generative language model interface configured to, the incident evaluation prompt including some or all of the database incident report, the incident evaluation prompt including a subset of database metrics retrieved from a metrics database storing database metrics characterizing operation of the database system, the incident evaluation prompt also including a natural language instruction executed by the generative language model to generate the textual description based on the subset of the database metrics, the one or more records being stored in a vector store and including textual information characterizing information related to a plurality of database incidents;

determining an instruction to resolve the database incident based on the textual description and the one or more records, the instruction to resolve the database incident being determined based on novel text generated by the generative language model and identifying a database configuration change executable by the database system; and executing the instruction to update one or more configuration parameters associated with the database system, the generative language model being tuned to determine the database configuration change based on tuning data characterizing responses to prior database incidents affecting the database system.

\*  \*  \*  \*  \*